US012586370B2

(12) United States Patent
Li et al.

(10) Patent No.: US 12,586,370 B2
(45) Date of Patent: Mar. 24, 2026

(54) VEHICLE IMAGE ANALYSIS SYSTEM FOR A PERIPHERAL CAMERA

(71) Applicant: GM Global Technology Operations LLC, Detroit, MI (US)

(72) Inventors: Chuan Li, Troy, MI (US); Andrew W. Averhart, Redford, MI (US); Adam Slifco, Farmington Hills, MI (US); Jace C. Stokes, Highland, MI (US); Jinzhu Chen, Troy, MI (US); Anil Patil, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 308 days.

(21) Appl. No.: 18/417,148

(22) Filed: Jan. 19, 2024

(65) Prior Publication Data

US 2025/0239069 A1    Jul. 24, 2025

(51) Int. Cl.
| | |
|---|---|
| *G06V 10/98* | (2022.01) |
| *G06V 10/12* | (2022.01) |
| *G06V 10/22* | (2022.01) |
| *G06V 10/50* | (2022.01) |
| *G06V 20/40* | (2022.01) |

(Continued)

(52) U.S. Cl.
CPC ............ *G06V 10/987* (2022.01); *G06V 10/12* (2022.01); *G06V 10/22* (2022.01); *G06V 10/50* (2022.01); *G06V 20/41* (2022.01); *G06V 20/46* (2022.01); *G06V 20/48* (2022.01); *G06V 20/588* (2022.01); *G06V 20/59* (2022.01)

(58) Field of Classification Search
CPC ...... G06V 10/987; G06V 10/12; G06V 10/22;
G06V 10/50; G06V 20/41; G06V 20/46;
G06V 20/48; G06V 20/588; G06V 20/59;
G06V 10/17; G06V 20/40; G06V 20/35;
G06V 20/36; G06V 20/38; G06V 20/49;
G06V 20/50; G06V 20/56; G06V 20/58;
G06V 20/70; G06V 2201/10; G06T 5/50;
G06T 2207/20224; G06T 2207/30252;
G06T 2207/30268; G06T 7/11; G06T
7/12; G06T 7/13; G06T 7/174; G06T
7/194; G06T 7/215; G06T 7/254; G06T
7/97; G06T 9/40; G06T 2207/10016;
G06T 2207/20021; G06T 2207/20112;
G06T 2207/20212; G06T 2207/20216;
G06T 2207/30244; G06T 2207/30248;
G06T 2207/30256; B60R 1/20; B60R
2300/30
See application file for complete search history.

(56) References Cited

U.S. PATENT DOCUMENTS 10,013,878 B2 * 7/2018 Ricci .................. G01C 21/3697
10,430,671 B2 * 10/2019 Moon .................... G06V 20/20
(Continued)

*Primary Examiner* — Matthew C Bella
*Assistant Examiner* — Nicholas John Helco
(74) *Attorney, Agent, or Firm* — Vivacqua Crane, PLLC

(57) ABSTRACT

An image analysis system for a vehicle that analyzes image data captured by one or more peripheral cameras includes one or more controllers that execute instructions to determine a source of the image data. The one or more peripheral cameras are part of a personal mobile device of an occupant of the vehicle. The source of the image data is either an exterior environment surrounding the vehicle or an internal environment representative of an interior cabin of the vehicle.

20 Claims, 4 Drawing Sheets

(51) Int. Cl.
    *G06V 20/56*      (2022.01)
    *G06V 20/59*      (2022.01)

(56)              References Cited

U.S. PATENT DOCUMENTS

| | | | |
|---|---|---|---|
| 2011/0134329 A1* | 6/2011 | Chen | G06T 5/73 |
| | | | 348/E5.066 |
| 2015/0256835 A1* | 9/2015 | Sakai | G06F 16/786 |
| | | | 375/240.25 |
| 2016/0019428 A1* | 1/2016 | Renner | G06T 7/0004 |
| | | | 382/195 |
| 2020/0254876 A1* | 8/2020 | Cordell | H04N 7/181 |
| 2020/0380269 A1* | 12/2020 | Mu | G05D 1/0088 |
| 2022/0051449 A1* | 2/2022 | Kuo | G06T 19/006 |
| 2022/0245792 A1* | 8/2022 | Gao | G06T 7/0008 |

\* cited by examiner

VEHICLE IMAGE ANALYSIS SYSTEM FOR A PERIPHERAL CAMERA

INTRODUCTION

The present disclosure relates to an image analysis system for a vehicle that analyzes image data captured by one or more one or more peripheral cameras. More particularly, the image analysis system determines a source of the image data, where the source is either an exterior environment surrounding the vehicle or an internal environment representative of an interior cabin of the vehicle.

An autonomous vehicle executes various tasks such as, but not limited to, perception, localization, mapping, path planning, decision making, and motion control. For example, an autonomous vehicle may include perception sensors such as a camera, LiDAR, and radar for collecting perception data regarding the environment surrounding the vehicle. It is to be appreciated that the perception data may be utilized by vehicle systems other than an autonomous driving system as well, such as a lane change assistant. However, in some instances, one or more perception sensors, such as the camera, may become non-operative for a variety of reasons.

In response to discovering the in-vehicle camera is no longer functional, an occupant of the vehicle may connect his or her personal mobile device, which includes a camera, to the vehicle's autonomous driving system via a wireless connection. The occupant's mobile device is sometimes referred to as a bring your own device (BYOD) camera. While BYOD cameras provide several advantages, they may also introduce several unique challenges as well. For example, the occupant may incorrectly position the lens of the BYOD camera such that image data representative of the interior cabin, instead of the exterior environment, is captured. Accordingly, various vehicle systems that rely upon image data such as, for example, the vehicle's autonomous driving system are required to first execute an algorithm confirming the image data captured by the BYOD camera is representative of the exterior environment surrounding the vehicle. However, it is to be appreciated that the existing algorithms for determining if the image data captured by the BYOD camera represents the exterior environment are computationally intensive. Furthermore, it is also to be appreciated that some vehicles may not include processors that have the computational resources to determine if the image data captured by the BYOD camera represents the exterior environment.

Thus, while current systems achieve their intended purpose, there is a need in the art for an improved approach for determining if a BYOD camera captures image data representative of the exterior environment surrounding the vehicle.

SUMMARY

According to several aspects, an image analysis system for a vehicle that analyzes image data captured by one or more peripheral cameras is disclosed. The image analysis system includes one or more controllers, where the one or more controllers each include one or more processors that execute instructions to receive the image data captured by the one or more peripheral cameras. The one or more controllers classify each image frame of the image data captured by the one or more peripheral cameras over a predefined period of time as either a keyframe or a delta frame. The one or more controllers compare an average frame size of all the delta frames that are part of the image data captured by the one or more peripheral cameras over the predefined period of time with a threshold average delta frame size. The one or more controllers determine a difference in pixel values between two image frames that are part of the image data captured by the one or more peripheral cameras with a threshold pixel value difference, wherein the two image frames are spaced apart by a time interval. In response to determining the difference in pixel values between two image frames that are part of the image data captured by the one or more peripheral cameras is less than or equal to the threshold pixel value difference, and determining the average frame size of all of the delta frames that are part of the image data captured by the one or more peripheral cameras over the predefined period of time is less than or equal to the threshold average delta frame size, the one or more controllers determine the image data captured by the one or more peripheral cameras represents an interior cabin of the vehicle. In response to determining the image data captured by the one or more peripheral cameras represents an interior cabin of the vehicle, the one or more controllers instruct one or more vehicle systems to disregard the image data captured by the peripheral camera.

In another aspect, in response determining the difference in pixel values between two image frames that are part of the image data captured by the one or more peripheral cameras is greater than the threshold pixel value difference, or the average frame size of all of the delta frames that are part of the image data captured by the one or more peripheral cameras over the predefined period of time is greater the threshold average delta frame size, the one or more controllers determine the image data captured by the one or more peripheral cameras potentially represents an exterior environment surrounding the vehicle.

In yet another aspect, in response to determining the image data captured by the one or more peripheral cameras potentially represents the exterior environment surrounding the vehicle, the one or more controllers determine a plurality of motion vectors that relate to a scene represented between two image frames that are part of the image data captured by the one or more peripheral cameras based on one or more video compression algorithms.

In an aspect, the one or more processors of the one or more controllers execute instructions to analyze a magnitude of each of the plurality of motion vectors between the two image frames to determine a change in motion that corresponds to each motion vector and map one or more regions of high motion and one or more regions of low motion within the two image frames by comparing the change in motion corresponding to each motion vector of the two image frames with a threshold motion value.

In another aspect, the one or more processors of the one or more controllers execute instructions to determine a percentage of the two image frames containing the regions of high motion, compare the percentage of the two image frames containing the regions of high motion with a threshold percentage value, in response to determining the percentage of the two image frames containing the regions of high motion is at least equal to the threshold percentage value, determine the image data captured by the one or more peripheral cameras potentially represents the exterior environment surrounding the vehicle, and in response to determining the percentage of the two image frames containing the regions of high motion is less than the threshold percentage value, determine the image data captured by the one or more peripheral cameras potentially represents the interior cabin of the vehicle.

In yet another aspect, the one or more processors of the one or more controllers execute instructions to analyze each macroblock of each image frame that is part of a plurality of image frames from the image data captured by the one or more peripheral cameras to determine regions of elevated motion within the plurality of image frames, where the plurality of image frames are collected over a length of time, compare a size of an area representing the region of elevated motion within the plurality of image frames with a threshold coverage area, and in response to determining the size of the area representing the region of elevated motion is equal to or greater than the threshold coverage area, determine the image data captured by the one or more peripheral cameras represents the exterior environment surrounding the vehicle.

In an aspect, in response to determining the image data captured by the one or more peripheral cameras represents the exterior environment surrounding the vehicle, the one or more controllers transmit the image data captured by the one or more peripheral cameras to one or more vehicle systems.

In another aspect, in response to determining the image data captured by the one or more peripheral cameras represents the exterior environment surrounding the vehicle, the one or more controllers execute one or more edge detection algorithms to identify land marking disposed along a roadway, and in response to identifying lane markings within the image data captured by the one or more peripheral cameras, confirm the image data is representative of the exterior environment surrounding the vehicle.

In yet another aspect, the one or more peripheral cameras are in electronic communication with the one or more controllers, and wherein the one or more peripheral cameras are part of a personal mobile device of an occupant of the vehicle.

In an aspect, in response to determining the image data captured by the one or more peripheral cameras represents an interior cabin of the vehicle, the one or more controllers instruct one or more notification devices to generate a notification indicating the one or more peripheral cameras are capturing image data of the interior cabin of the vehicle.

In another aspect, the one or more peripheral cameras is a bring your own device (BYOD) camera.

In yet another aspect, the one or more peripheral cameras represents a device that is temporarily connected to the one or more controllers in response to determining one or more in-vehicle cameras are non-operational.

In an aspect, threshold average delta frame size is selected to be at least equal to an average delta frame size of a stream of image data representative of an interior cabin of the vehicle and less than an average delta frame size of a stream of image data representative of an exterior environment surrounding the vehicle.

In another aspect, a method for analyzing image data captured by one or more peripheral cameras of a vehicle is disclosed. The method includes receiving, by one or more controllers, the image data captured by the one or more peripheral cameras. The method also includes classifying, by the one or more controllers, each image frame of the image data captured by the one or more peripheral cameras over a predefined period of time as either a keyframe or a delta frame. The method further includes comparing, by the one or more controllers, an average frame size of all the delta frames that are part of the image data captured by the one or more peripheral cameras over the predefined period of time with a threshold average delta frame size. The method also includes determining, by the one or more controllers, a difference in pixel values between two image frames that are part of the image data captured by the one or more peripheral cameras with a threshold pixel value difference, where the two image frames are spaced apart by a time interval. In response to determining the difference in pixel values between two image frames that are part of the image data captured by the one or more peripheral cameras is less than or equal to the threshold pixel value difference, and determining the average frame size of all of the delta frames that are part of the image data captured by the one or more peripheral cameras over the predefined period of time is less than or equal to the threshold average delta frame size, the method includes determining the image data captured by the one or more peripheral cameras represents an interior cabin of the vehicle. In response to determining the image data captured by the one or more peripheral cameras represents an interior cabin of the vehicle, the method includes instructing one or more vehicle systems to disregard the image data captured by the peripheral camera.

In another aspect, in response determining the difference in pixel values between two image frames that are part of the image data captured by the one or more peripheral cameras is greater than the threshold pixel value difference, or the average frame size of all of the delta frames that are part of the image data captured by the one or more peripheral cameras over the predefined period of time is greater than the threshold average delta frame size, the method includes determining the image data captured by the one or more peripheral cameras potentially represents an exterior environment surrounding the vehicle.

In yet another aspect, in response to determining the image data captured by the one or more peripheral cameras potentially represents the exterior environment surrounding the vehicle, the method includes determining a plurality of motion vectors that relate to a scene represented between two image frames that are part of the image data captured by the one or more peripheral cameras based on one or more video compression algorithms.

In an aspect, the method includes analyzing a magnitude of each of the plurality of motion vectors between the two image frames to determine a change in motion that corresponds to each motion vector, and mapping one or more regions of high motion and one or more regions of low motion within the two image frames by comparing the change in motion corresponding to each motion vector of the two image frames with a threshold motion value.

In another aspect, the method includes determining a percentage of the two image frames containing the regions of high motion, comparing the percentage of the two image frames containing the regions of high motion with a threshold percentage value, in response to determining the percentage of the two image frames containing the regions of high motion is at least equal to the threshold percentage value, determining the image data captured by the one or more peripheral cameras potentially represents the exterior environment surrounding the vehicle, and in response to determining the percentage of the two image frames containing the regions of high motion is less than the threshold percentage value, determining the image data captured by the one or more peripheral cameras potentially represents the interior cabin the vehicle.

In yet another aspect, the method includes analyzing each macroblock of each image frame that is part of a plurality of image frames from the image data captured by the one or more peripheral cameras to determine regions of elevated motion within the plurality of image frames, where the plurality of image frames are collected over a length of time, comparing a size of an area representing the region of elevated motion within the plurality of image frames with a threshold coverage area, and in response to determining the size of the area representing the region of elevated motion is equal to or greater than the threshold coverage area, determining the image data captured by the one or more peripheral cameras represents the exterior environment surrounding the vehicle.

In an aspect, an image analysis system for a vehicle that analyzes image data is disclosed. The image analysis system includes one or more peripheral cameras that capture the image data, one or more notification devices that generate a notification for an occupant of the vehicle, and one or more controllers in electronic communication with the one or more peripheral cameras and the one or more notification devices. The one or more controllers each include one or more processors that execute instructions to receive the image data captured by the one or more peripheral cameras. The one or more controllers classify each image frame of the image data captured by the one or more peripheral cameras over a predefined period of time as either a keyframe or a delta frame. The one or more controllers compare an average frame size of all the delta frames that are part of the image data captured by the one or more peripheral cameras over the predefined period of time with a threshold average delta frame size. The one or more controllers determine a difference in pixel values between two image frames that are part of the image data captured by the one or more peripheral cameras with a threshold pixel value difference, where the two image frames are spaced apart by a time interval. In response to determining the difference in pixel values between two image frames that are part of the image data captured by the one or more peripheral cameras is less than or equal to the threshold pixel value difference, and determining the average frame size of all of the delta frames that are part of the image data captured by the one or more peripheral cameras over the predefined period of time is less than or equal to the threshold average delta frame size, the one or more controllers determine the image data captured by the one or more peripheral cameras represents an interior cabin of the vehicle. Finally, in response to determining the image data captured by the one or more peripheral cameras represents an interior cabin of the vehicle, the one or more controllers instruct the one or more notification devices to generate a notification indicating the one or more peripheral cameras are capturing image data of the interior cabin of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
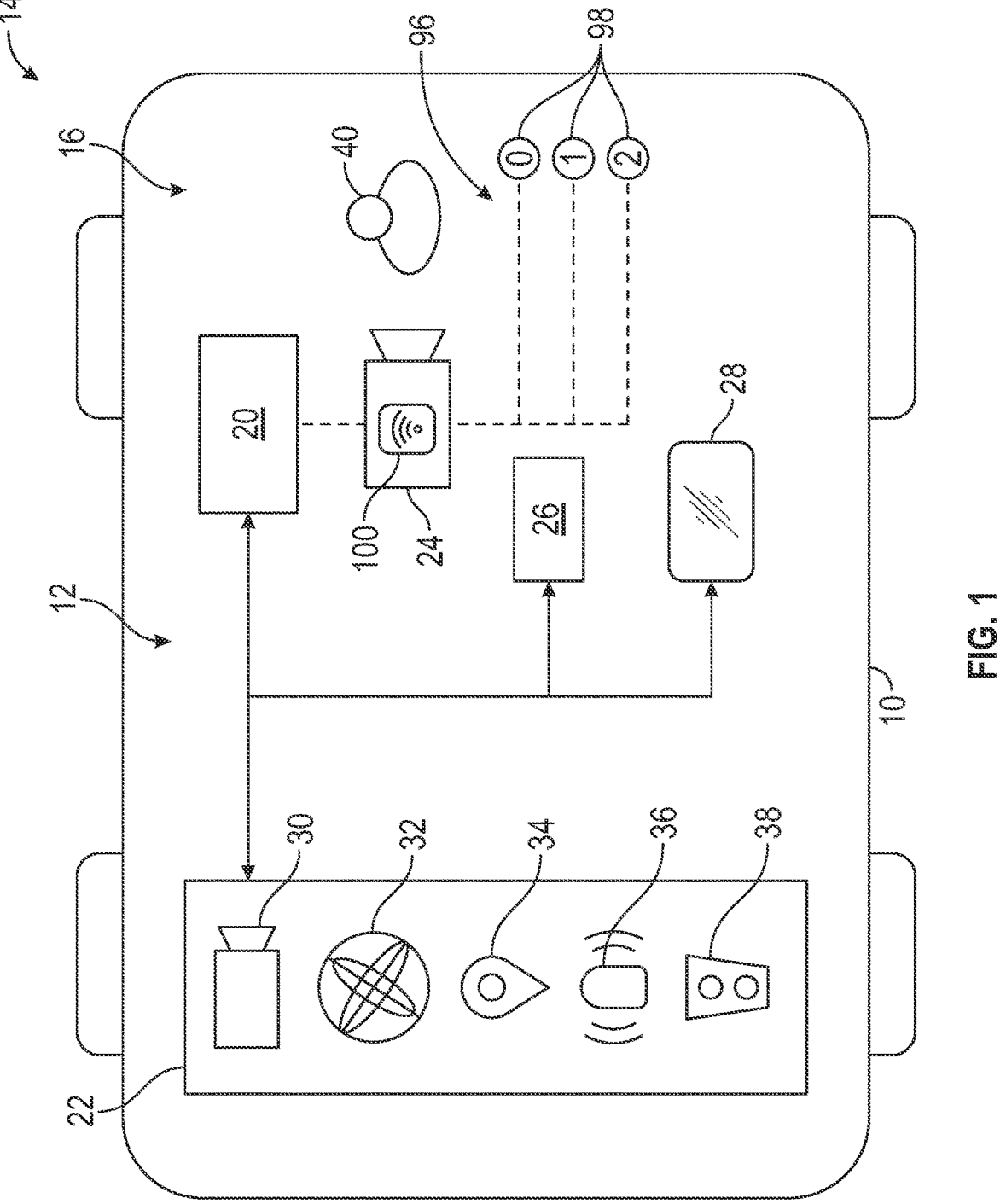
FIG. 1 illustrates a schematic diagram of a vehicle including the disclosed image analysis system including one or more controllers connected to one or more peripheral cameras, according to an exemplary embodiment.

Referring to FIG. 1, a vehicle 10 including the disclosed image analysis system 12 is illustrated. As explained below, the image analysis system 12 analyzes image data captured by one or more one or more peripheral cameras 24 to determine if the image data represents an exterior environment 14 surrounding the vehicle 10 or an internal environment representative of the interior cabin 16 of the vehicle 10. The image analysis system 12 includes one or more controllers 20 in electronic communication with a plurality of perception sensors 22 and the one or more peripheral cameras 24. The plurality of perception sensors 22 are configured to collect perception data indicative of the exterior environment 14 surrounding the vehicle 10. In the non-limiting embodiment as shown in FIG. 1, the plurality of perception sensors 22 include one or more in-vehicle cameras 30, an inertial measurement unit (IMU) 32, a global positioning system (GPS) 34, radar 36, and LiDAR 38, however, is to be appreciated that additional sensors may be used as well. It is to be appreciated that the vehicle 10 may be any type of vehicle such as, but not limited to, a sedan, a truck, sport utility vehicle, van, or motor home.

The one or more peripheral cameras 24 represents a device that is not normally connected to the one or more controllers 20 of the image analysis system 12. Instead, the one or more peripheral cameras 24 represent a device that is temporarily connected to the one or more controllers 20 in response to determining the one or more in-vehicle cameras 30 are non-operational. In contrast, the one or more in-vehicle cameras 30 are part of the vehicle 10 and are normally connected to the one or more controllers 20 of the image analysis system 12. However, in some instances, the one or more in-vehicle cameras 30 may become non-operational and are no longer capable of capturing data representative of the exterior environment 14. Instead, the occupant 40 may electronically connect the one or more peripheral cameras 24 to the one or more controllers 20. In the non-limiting embodiment as shown in FIG. 1, the one or more peripheral cameras 24 is connected to the one or more controllers 20 based on a wireless connection, however, it is to be appreciated that a wired connection may be used as well.

In one embodiment, the one or more peripheral cameras 24 may be part of a personal mobile device of an occupant 40 of the vehicle 10. Some examples of personal mobile devices include, but are not limited to, a smartphone, a smartwatch, or a tablet computer. For example, in one embodiment, the one or more peripheral cameras 24 include a bring your own device (BYOD) camera.

The one or more vehicle systems 26 may be any type of vehicle system that requires image data of the exterior environment 14 to complete one or more tasks. Some examples of the one or more vehicle systems 26 include, but are not limited to, an autonomous driving system and a lane change assistant. Merely by way of example, if the one or more vehicle systems 26 is an autonomous driving system, then image data may be used for tasks such as, but not limited to, perception, localization, mapping, path planning, decision making, and motion control. As another example, if the one or more vehicle systems 26 include a lane change assistant, then the image data may be used to determine if it is possible for the vehicle 10 to change lanes. It is to be appreciated that in addition to the image analysis system 12 analyzing the image data captured by one or more one or more peripheral cameras 24 to determine if the image data represents an exterior environment 14 or the internal environment, the image data may be analyzed for additional requirements unique to a specific vehicle system 26 as well.

The one or more notification devices 28 may include any device placed within the interior cabin 16 of the vehicle 10 for generating a notification directed to the occupant 40. The notification directed to the occupant may be a visual notification, an audio notification, or a haptic notification. In the non-limiting embodiment as shown in FIG. 1, the notification device 28 is a display that shows text and graphics. In another embodiment, the one or more notification devices 28 include a speaker for generating an audio notification. In yet another embodiment, the one or more notification devices 28 include a smart seating system that includes one or more haptic devices installed within the seats.

As explained below, the one or more controllers 20 of the image analysis system 12 determines a source of the image data captured by the one or more peripheral cameras 24, where the source is either the exterior environment 14 surrounding the vehicle 10 or the internal environment representative of the interior cabin 16 of the vehicle 10. It is to be appreciated that if the source of the image data captured by the one or more peripheral cameras 24 is the internal environment representative of the interior cabin 16 of the vehicle 10, then the image data may not be utilized by the one or more vehicle systems 26, as the one or more vehicle systems 26 require image data representative of the exterior environment 14 instead. In response to determining the image data captured by the one or more peripheral cameras 24 is of the internal environment representative of the interior cabin 16 of the vehicle 10, in one non-limiting embodiment the one or more controllers 20 instruct the one or more notification devices 28 to generate the notification to the occupant 40 indicating the one or more peripheral cameras 24 are capturing image data of the internal environment representative of the interior cabin 16 of the vehicle 10. Otherwise, the image data captured by the one or more peripheral cameras 24 is transmitted to the one or more vehicle system 26.

Figure 2:
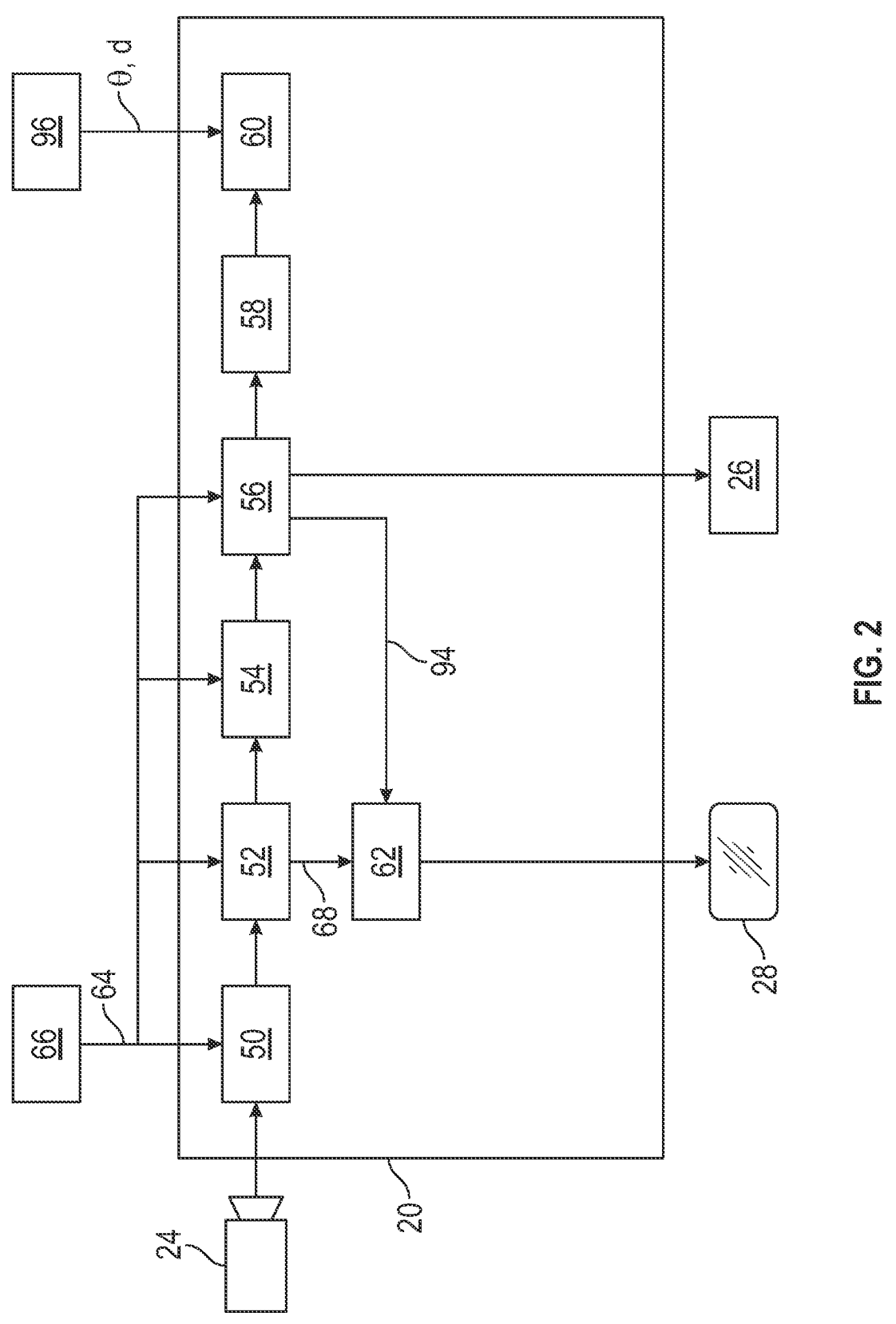
FIG. 2 is a block diagram illustrating the software architecture of the one or more controllers shown in FIG. 1, according to an exemplary embodiment.

FIG. 2 is a block diagram illustrating the software architecture of the one or more controllers 20. The one or more controllers 20 include a frame analysis module 50, a frame differencing module 52, a spatial motion vector analysis module 54, a spatial and temporal motion vector analysis module 56, an edge detection module 58, a reassessment module 60, and a notification module 62. As seen in FIG. 2, the frame analysis module 50 of the one or more controllers 20 receives the image data captured by the one or more peripheral cameras 24 and one or more vehicle dynamics parameters 64 from another external controller 66 that is part of the vehicle 10. The one or more vehicle dynamics parameters 64 indicate a rate of motion of the vehicle 10, and include parameters such as, but not limited to, vehicle speed.

The frame analysis module 50 of the one or more controllers 20 classifies each image frame that is part of the image data captured by the one or more peripheral cameras 24 over a predefined period of time as either a keyframe or a non-keyframe, where the non-keyframe is referred to as the delta frame. The frame analysis module 50 compares an average frame size of all the delta frames that are part of the image data captured by the one or more peripheral cameras 24 over the predefined period of time with a threshold average delta frame size. In response to determining the average frame size of all of the delta frames that are part of the image data captured by the one or more peripheral cameras 24 over the predefined period of time is less than or equal to the threshold average delta frame size, the frame analysis module 50 determines the image data captured by the one or more peripheral cameras 24 potentially represents the interior cabin 16 of the vehicle 10.

It is to be appreciated that a keyframe represents the entire image frame, while the delta frame only includes portions of the image frame that have changed over time based on a respective keyframe. The threshold average delta frame size is selected to be at least equal to an average delta frame size of a stream of image data representative of the interior cabin 16 of the vehicle 10 and less than an average delta frame size of a stream of image data representative of the exterior environment 14 surrounding the vehicle 10. It is to be appreciated that the average delta frame size of the stream of image data representative of the interior cabin 16 of the vehicle 10 is less than the average delta frame size of the stream of image data representative of the exterior environment 14 surrounding the vehicle 10. This is because the stream of image data representative of the interior cabin 16 of the vehicle 10 changes less when compared to the stream of image data representative of the exterior environment 14 surrounding the vehicle 10. It is to be appreciated that the average delta frame size of the stream of image data representative of the exterior environment 14 surrounding the vehicle 10 is dependent upon the rate of motion of the vehicle 10 as indicated by the one or more vehicle dynamics parameters 64.

In response to determining the average frame size of all the delta frames that are part of the image data captured by the one or more peripheral cameras 24 over the predefined period of time is less than or equal to the threshold average delta frame size, the frame analysis module 50 of the one or more controllers 20 determines the image data captured by the one or more peripheral cameras 24 potentially represents the interior cabin 16 of the vehicle 10. Otherwise, the frame analysis module 50 of the one or more controllers 20 determines the image data captured by the one or more peripheral cameras 24 potentially represents the exterior environment 14 surrounding the vehicle 10. The frame analysis module 50 transmits the image data captured by the one or more peripheral cameras 24 to the frame differencing module 52.

The frame differencing module 52 of the one or more controllers 20 determines a difference in pixel values between two image frames that are part of the image data captured by the one or more peripheral cameras 24 with a threshold pixel value difference, where the two image frames are spaced apart by a time interval. The time interval is determined based on the rate of motion of the vehicle 10 indicated by the one or more vehicle dynamics parameters 64. The time interval is selected to reflect a change in scenery of the exterior environment 14 that occurs as the vehicle 10 is traveling at the rate of motion as indicated by the one or more vehicle dynamics parameters 64. In one non-limiting embodiment, the time interval is about one second, however, it is to be appreciated that other values may be used as well.

In one embodiment, each pixel that is part of each of the two image frames is evaluated, however, in another embodiment only a portion of the pixels that are part of the two image frames are evaluated. However, it is to be appreciated that the same pixel location is evaluated between the two image frames to ensure consistency. In one embodiment, the pixel values are expressed based on one or more numerical values, where each numerical value represents one of the colors that are part of a respective color model. Merely by way of example, a pixel based on the red-green-blue (RGB) color model would be expressed as red: 6, green: 250, blue: 7. It is also to be appreciated that while the RGB color model is described, the pixels may be based on any other color model as well, such as the cyan, magenta, yellow, and black (CMYB) color model and the YUV color model, where Y is for luma or brightness, U represents the blue projection, and V represents the red projection.

The threshold pixel value difference is at least equal to a difference in pixel values based on the stream of image data representative of the interior cabin 16 of the vehicle 10 and less than a difference in pixel values based on the stream of image data representative of the exterior environment 14 surrounding the vehicle 10. The threshold pixel value difference is expressed as one or more numerical values, where each numerical value corresponds to one of the colors of the corresponding color model. For example, if the image data captured by the peripheral camera 24 is based on the RGB color model, and if one of the pixels is expressed as red: 60, green: 250, blue: 17 and the subsequent pixel is expressed as red: 10, green: 50, blue: 7, then the difference in pixel values is expressed as red: 50, green: 200, blue: 10. It is to be appreciated that the difference in pixel values based on the stream of image data representative of the interior cabin 16 of the vehicle 10 is less than the difference in pixel values based on the stream of image data representative of the exterior environment 14 surrounding the vehicle 10. As mentioned above, this is because the stream of image data representative of the interior cabin 16 of the vehicle 10 changes less when compared to the stream of image data representative of the exterior environment 14 surrounding the vehicle 10.

In response to determining the difference in pixel values between two image frames that are part of the image data captured by the one or more peripheral cameras 24 is less than or equal to the threshold pixel value difference, the frame differencing module 52 of the one or more controllers 20 determines the image data captured by the one or more peripheral cameras 24 potentially represents the interior cabin 16 of the vehicle 10. Specifically, if the frame analysis module 50 and the frame differencing module 52 both determine the image data captured by the one or more peripheral cameras 24 potentially represents the interior cabin of the vehicle 10, then the one or more controllers 20 determine the image data captured by the peripheral camera 24 represents the interior cabin of the vehicle 10 and instructs the one or more vehicle systems 26 to disregard the image data captured by the peripheral camera 24. In one non-limiting embodiment, the frame differencing module 52 may then send a signal 68 to the notification module 62 indicating the image data captured by the peripheral camera 24 represents the interior cabin of the vehicle 10. The notification module 62 then instructs the one or more notification devices 28 to generate the notification to the occupant 40 indicating the one or more peripheral cameras 24 are capturing image data of the internal environment representative of the interior cabin 16 of the vehicle 10.

In response to either the frame differencing module 52 determining the difference in pixel values between two image frames that are part of the image data captured by the one or more peripheral cameras 24 is greater than the threshold pixel value difference or the frame analysis module 50 determining the average frame size of all of the delta frames that are part of the image data captured by the one or more peripheral cameras 24 over the predefined period of time is greater than the threshold average delta frame size, the one or more controllers 20 determine the image data captured by the one or more peripheral cameras 24 potentially represents the exterior environment 14 surrounding the vehicle 10. The frame differencing module 52 may then transmit the image data captured by the one or more peripheral cameras 24 to the spatial motion vector analysis module 54 for spatial analysis.

Figure 3:
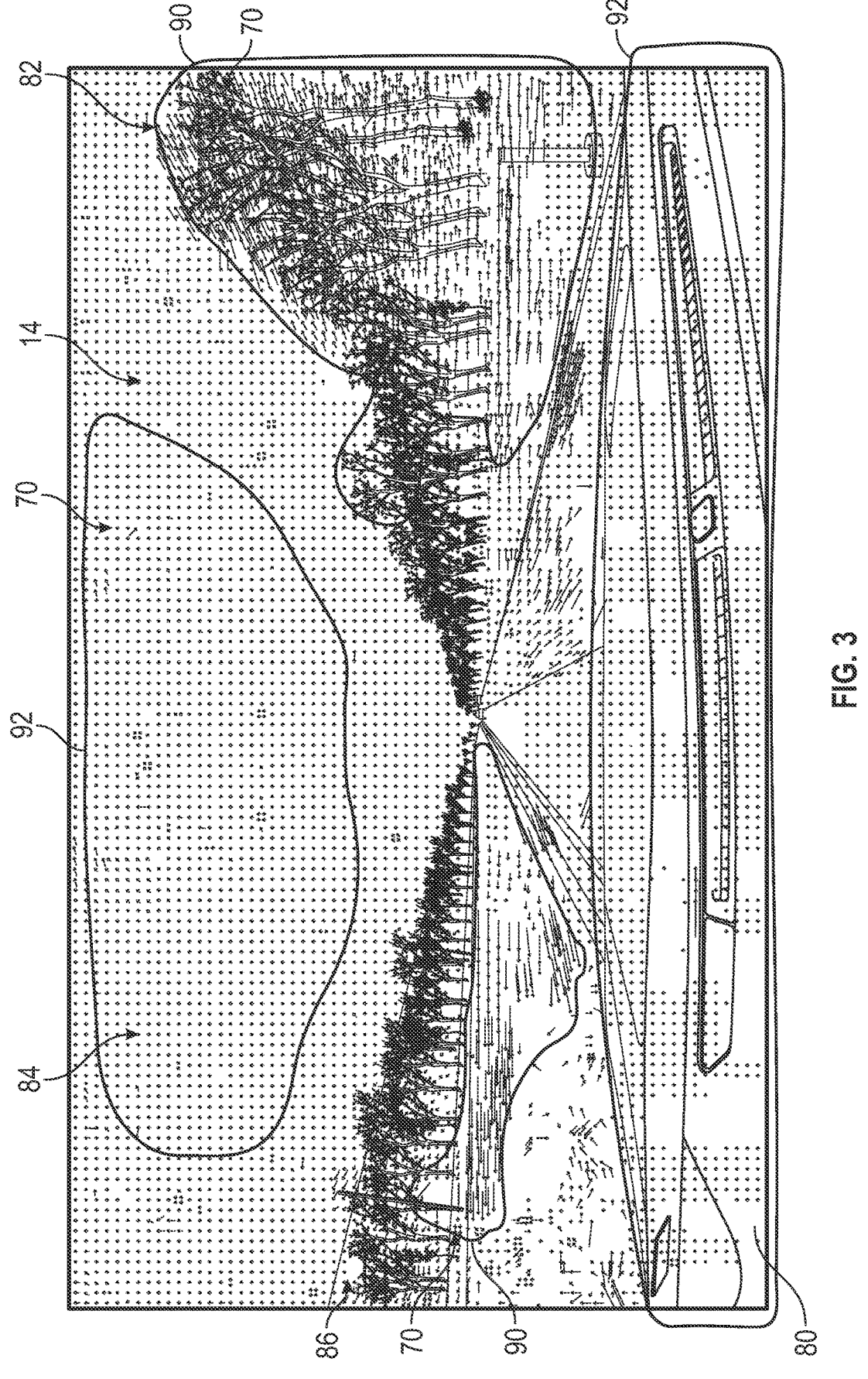
FIG. 3 is an exemplary illustration of an image frames that is part of image data captured by the one or more peripheral cameras shown in FIG. 1, according to an exemplary embodiment.

The spatial motion vector analysis module 54 of the one or more controllers 20 determines a plurality of motion vectors 70 (shown in FIG. 3) that relate to a scene represented between two image frames that are part of the image data captured by the one or more peripheral cameras 24 based on one or more video compression algorithms. Some examples of video compression algorithms include, but are not limited to, AOMedia Video 1 (AV1) and advanced video coding (AVC), also called H.264. FIG. 3 is an exemplary illustration of one of the two image frames, where the image data captures a portion of an instrumentation panel 80 of the vehicle 10 as well as the exterior environment 14 surrounding the vehicle 10. Specifically, in the example as shown in FIG. 3, the exterior environment 14 surrounding the vehicle 10 includes vegetation 82 to the right that includes several trees, the sky 84, and a grassy area 86 to the left.

Referring to FIGS. 2 and 3, the spatial motion vector analysis module 54 of the one or more controllers 20 analyze a magnitude of each of the plurality of motion vectors 70 between the two image frames to determine a change in motion that corresponds to each motion vector 70. The spatial motion vector analysis module 54 of the one or more controllers 20 then maps one or more regions of high motion 90 and one or more regions of low motion 92 within the two image frames by comparing the change in motion corresponding to each motion vector 70 of the two image frames with a threshold motion value. The threshold motion value is dependent upon the rate of motion of the vehicle 10 as indicated by the one or more vehicle dynamics parameters 64.

The threshold motion value represents the change in motion that is experienced between two image frames when the corresponding image data represents the interior cabin 16 of the vehicle 10. If the change in motion of a motion vector 70 is greater than the threshold motion value, then the motion vector 70 corresponds to image data representing the exterior environment 14 surrounding the vehicle 10. In the example as shown in FIG. 3, the vegetation 82 and the grassy area 86 both represent regions of high motion 90, while the instrumentation panel 80, which is located within the interior cabin 16, and the sky 84 both represent regions of low motion 92. The spatial motion vector analysis module 54 of the one or more controllers 20 determines a percentage of the two image frames containing the regions of high motion 90 and compares the percentage of the two image frames containing the regions of high motion 90 with a threshold percentage value. The threshold percentage value indicates a non-trivial portion of the scene represented between the two image frames captures the exterior environment 14 surrounding the vehicle 10. In an embodiment, the threshold percentage is about twenty percent, however, other values may be used as well.

In response to determining the percentage of the two image frames containing the regions of high motion 90 is at least equal to the threshold percentage value, the spatial motion vector analysis module 54 of the one or more controllers 20 determines the image data captured by the one or more peripheral cameras 24 potentially represents the exterior environment 14 surrounding the vehicle 10. Otherwise, the spatial motion vector analysis module 54 of the one or more controllers 20 determines the image data captured by the one or more peripheral cameras 24 potentially represents the interior cabin 16 the vehicle 10.

The spatial and temporal motion vector analysis module 56 of the one or more controllers 20 analyze each macroblock of each image frame that is part of a plurality of image frames from the image data captured by the one or more peripheral cameras 24 to determine regions of elevated motion within the plurality of image frames, where the plurality of image frames are collected over a length of time. The spatial and temporal motion vector analysis module 56 of the one or more controllers 20 compare a size of an area representing the region of elevated motion within the plurality of image frames with a threshold coverage area. In response to determining the size of the area representing the region of elevated motion is equal to or greater than the threshold coverage area, the spatial and temporal motion vector analysis module 56 of the one or more controllers 20 determine the image data captured by the one or more peripheral cameras 24 represents the exterior environment 14 surrounding the vehicle 10.

The length of time is determined based on the rate of motion of the vehicle 10 as indicated by the one or more vehicle dynamics parameters 64, a target confidence level, and the computing power of the one or more controllers 20. In one non-limiting embodiment, the length of time is about ten seconds. The threshold coverage area is selected to exclude outlier data and to disregard trivial areas of the plurality of image frames that include sections of the exterior environment 14, which cover less than five percent of the total area of the image frame. In one non-limiting embodiment, the threshold coverage area is about twenty percent of the total area of the image frame.

Determining regions of elevated motion within the plurality of image frames by the spatial and temporal motion vector analysis module 56 of the one or more controllers 20 shall now be described. The spatial and temporal motion vector analysis module 56 of the one or more controllers 20 first compute a two-dimensional vector for each pixel that is part of each macroblock of each image frame that is part of the plurality of image frames. For example, in one embodiment, the macroblock is sized to include 256 pixels, however, it is to be appreciated the macroblocks may include a different number of pixels as well. The spatial and temporal motion vector analysis module 56 of the one or more controllers 20 then adds all the two-dimensional vectors corresponding to each pixel that is part of a specific macroblock together. The spatial and temporal motion vector analysis module 56 of the one or more controllers 20 continues to add all the two-dimensional vectors corresponding to each pixel that is part of a specific macroblock together until the length of time has expired.

In response to determining the length of time has expired, the spatial and temporal motion vector analysis module 56 of the one or more controllers 20 determine a real length of an overall motion vector corresponding to the specific macroblock based on the Pythagorean theorem formula. The spatial and temporal motion vector analysis module 56 of the one or more controllers 20 compares the real length of the overall motion vector corresponding to the specific macroblock with a threshold overall motion vector value. The threshold overall motion vector value is selected to be representative of motion observed within the exterior environment 14 surrounding the vehicle 10. In response to determining the real length of the overall motion vector corresponding to the specific macroblock is equal to or greater than threshold overall motion vector value, the spatial and temporal motion vector analysis module 56 of the one or more controllers 20 determines the specific macroblock is part of a region of elevated motion within the plurality of image frames.

It is to be appreciated that in the embodiment as described, the one or more vehicle systems 26 require image data of the exterior environment 14 to complete one or more tasks. Accordingly, in response to determining the image data captured by the one or more peripheral cameras 24 represents the exterior environment 14 surrounding the vehicle 10, the spatial and temporal motion vector analysis module 56 of the one or more controllers 20 transmits the image data captured by the one or more peripheral cameras 24 to the one or more vehicle systems 26. Otherwise, the spatial and temporal motion vector analysis module 56 of the one or more controllers 20 determines the image data captured by the one or more peripheral cameras 24 represents the interior cabin 16 of the vehicle 10 and instructs the one or more vehicle systems 26 to disregard the image data. In one non-limiting embodiment, the spatial and temporal motion vector analysis module 56 transmits a signal 94 to the notification module 62 indicating the image data captured by the peripheral camera 24 represents the interior cabin of the vehicle 10. The notification module 62 then instructs the one or more notification devices 28 to generate the notification to the occupant 40 indicating the one or more peripheral cameras 24 are capturing image data of the internal environment representative of the interior cabin 16 of the vehicle 10.

In an alternative embodiment, the one or more vehicle systems 26 may require image data of the represents the interior cabin 16 of the vehicle 10 instead of the exterior environment 14 to complete one or more tasks. Accordingly, in response to determining the image data captured by the one or more peripheral cameras 24 represents the interior cabin 16 of the vehicle 10, the spatial and temporal motion vector analysis module 56 of the one or more controllers 20 transmits the image data captured by the one or more peripheral cameras 24 to the one or more vehicle systems 26. Otherwise, the spatial and temporal motion vector analysis module 56 of the one or more controllers 20 determines the image data captured by the one or more peripheral cameras 24 represents the exterior environment 14 and instructs the one or more vehicle systems 26 to disregard the image data. In one embodiment, the spatial and temporal motion vector analysis module 56 may transmit the signal 94 to the notification module 62, and the notification module 62 then instructs the one or more notification devices 28 to generate the notification to the occupant 40 indicating the one or more peripheral cameras 24 are capturing image data of the exterior environment 14.

In one non-limiting embodiment, the edge detection module 58 of the one or more controllers 20 confirms that the image data captured by the one or more peripheral cameras 24 is representative of the exterior environment 14 surrounding the vehicle 10. Specifically, the edge detection module 58 of the one or more controllers 20 executes one or more edge detection algorithms to identify lane markings that are disposed along a roadway in the image data captured by the one or more peripheral cameras 24. In response to identifying lane markings within the image data captured by the one or more peripheral cameras 24, the edge detection module 58 of the one or more controllers 20 confirms the image data captured by the one or more peripheral cameras 24 is representative of the exterior environment 14. It is to be appreciated that confirming that the image data captured by the one or more peripheral cameras 24 is optional and may be omitted in some embodiments.

In one embodiment, the reassessment module 60 of the one or more controllers 20 may continuously monitor an orientation angle θ and a location d of the one or more peripheral cameras 24 based on an ultra-wide band (UWB) sensor network 96. Referring to both FIGS. 1 and 2, the UWB sensor network 96 includes three or more anchors 98 mounted to the vehicle 10 (shown in FIG. 1), while a tag 100 (FIG. 1) of the UWB sensor network 96 is mounted to the one or more peripheral cameras 24. The tag 100 is a mobile sensor that is moveably remote from the vehicle 10 that sends and receives sensor signals. Each anchor 98 of the UWB sensor network 96 is in wireless communication with the tag 100 to send and receive the sensor signals for tracking the tag 100.

The reassessment module 60 continuously monitors UWB sensor network 96 for the orientation angle θ and the location d of the one or more peripheral cameras 24 until detecting a change in the orientation angle θ, the location d, or both the orientation angle θ and the location d of the one or more cameras 24 has exceeded a threshold value. In response to determining the change in the orientation angle θ, the location d, or both the orientation angle θ and the location d of the one or more cameras 24 has exceeded the threshold value, the reassessment module 60 instructs the one or more controllers 20 to re-evaluate if the image data captured by the one or more peripheral cameras 24 represents the interior cabin 16 of the vehicle 10. The threshold value is indicative of the occupant 40 (FIG. 1) repositioning the one or more peripheral cameras 24 to capture image data of another environment. For example, although the one or more peripheral cameras 24 may have been positioned to capture image data of the exterior environment 14, the occupant 40 may decide to re-position the one or more peripheral cameras 24 to capture image data representative of the interior cabin 16 instead.

Figure 4:
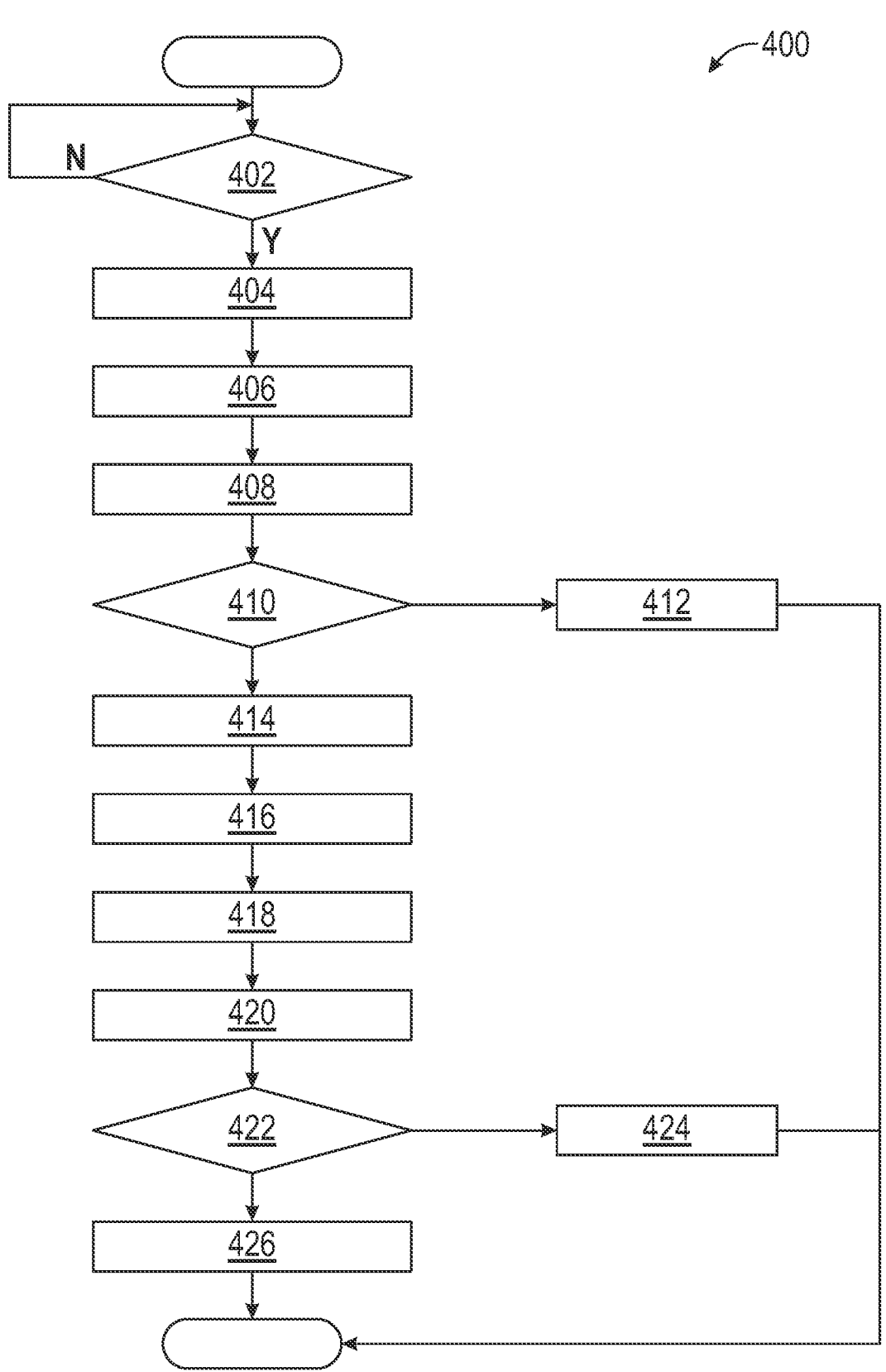
FIG. 4 is a process flow diagram illustrating a method of analyzing the image data captured by the one or more peripheral cameras by the disclosed image analysis system shown in FIG. 1, according to an exemplary embodiment.

FIG. 4 is a process flow diagram illustrating a method 400 for analyzing the image data captured by the one or more peripheral cameras 24 by the disclosed image analysis system 12 shown in FIG. 1. Referring generally to FIGS. 1, 2, and 4, the method 400 may begin at decision block 402. In decision block 402, the one or more controllers 20 continue to monitor the one or more peripheral cameras 24 until receiving the image data captured by the one or more peripheral cameras 24. In response to receiving the image data, the method 400 proceeds to block 404.

In block 404, the frame analysis module 50 of the one or more controllers 20 classifies each image frame of the image data captured by the one or more peripheral cameras 24 over the predefined period of time as either a keyframe or a delta frame. The method 400 may then proceed to block 406.

In block 406, the frame analysis module 50 of the one or more controllers 20 compares the average frame size of all the delta frames that are part of the image data captured by the one or more peripheral cameras 24 over the predefined period of time with the threshold average delta frame size. In response to determining the average frame size of all of the delta frames that are part of the image data captured by the one or more peripheral cameras 24 over the predefined period of time is less than or equal to the threshold average delta frame size, the frame analysis module 50 determines the image data captured by the one or more peripheral cameras 24 potentially represents the interior cabin 16 of the vehicle 10. In response to determining the average frame size of all of the delta frames that are part of the image data captured by the one or more peripheral cameras 24 over the predefined period of time is greater than the threshold average delta frame size, the frame analysis module 50 determines the image data captured by the one or more peripheral cameras 24 potentially represents the exterior environment 14 surrounding the vehicle 10. The method 400 may then proceed to block 408.

In block 408, the frame differencing module 52 of the one or more controllers 20 determines the difference in pixel values between two image frames that are part of the image data captured by the one or more peripheral cameras with the threshold pixel value difference, where the two image frames are spaced apart by the time interval. The method 400 may then proceed to decision block 410.

In decision block 412, in response to the frame differencing module 52 of the one or more controllers 20 determining the difference in pixel values between two image frames that are part of the image data captured by the one or more peripheral cameras 24 is less than or equal to the threshold pixel value difference, and the frame differencing module 52 of the one or more controllers 20 determining the average frame size of all of the delta frames that are part of the image data captured by the one or more peripheral cameras 24 over the predefined period of time is less than or equal to the threshold average delta frame size, the frame differencing module 52 determines the image data captured by the one or more peripheral cameras represents the interior cabin of the vehicle 10. The frame differencing module 52 then instructs the one or more vehicle systems 26 to disregard the image data captured by the peripheral camera 24. The method 400 may then proceed to block 412.

In block 412, in response to determining the image data captured by the one or more peripheral cameras 24 represents the interior cabin 16 of the vehicle 10, the frame differencing module 52 sends the signal 68 to the notification module 62 indicating the image data captured by the peripheral camera 24 represents the interior cabin of the vehicle 10. The notification module 62 then instructs the one or more notification devices 28 to generate the notification to the occupant 40 indicating the one or more peripheral cameras 24 are capturing image data of the internal environment representative of the interior cabin 16 of the vehicle 10. It is to be appreciated that in embodiments, the notification to the occupant 40 may not be sent. The method 400 may then terminate.

Returning back to block 410, in response to the frame differencing module 52 of the one or more controllers 20 determining the difference in pixel values between two image frames that are part of the image data captured by the one or more peripheral cameras 24 greater than the threshold pixel value difference, or the frame differencing module 52 of the one or more controllers 20 determining the average frame size of all of the delta frames that are part of the image data captured by the one or more peripheral cameras 24 over the predefined period of time is greater the threshold average delta frame size, the frame differencing module 52 determines the image data captured by the one or more peripheral cameras potentially represents the exterior environment 14 surrounding the vehicle 10 and the method 400 proceeds to block 414.

In block 414, in response to determining the image data captured by the one or more peripheral cameras 24 potentially represents the exterior environment 14 surrounding the vehicle 10, the spatial motion vector analysis module 54 of the one or more controllers 20 determine the plurality of motion vectors 70 (shown in FIG. 3) that relate to a scene represented between two image frames that are part of the image data captured by the one or more peripheral cameras 24 based on one or more video compression algorithms. The method 400 may then proceed to block 416.

In block 416, the spatial motion vector analysis module 54 of the one or more controllers 20 analyzes the magnitude of each of the plurality of motion vectors 70 (shown in FIG. 3) between the two image frames to determine a change in motion that corresponds to each motion vector 70, and maps one or more regions of high motion 90 and one or more regions of low motion 92 within the two image frames by comparing the change in motion corresponding to each motion vector 70 of the two image frames with a threshold motion value. The method 400 may then proceed to block 418.

In block 418, the spatial motion vector analysis module 54 of the one or more controllers 20 determine a percentage of the two image frames containing the regions of high motion 90 and compares the percentage of the two image frames containing the regions of high motion 90 with a threshold percentage value. In response to determining the percentage of the two image frames containing the regions of high motion 90 is at least equal to the threshold percentage value, the spatial motion vector analysis module 54 of the one or more controllers 20 determine the image data captured by the one or more peripheral cameras 24 potentially represents the exterior environment 14 surrounding the vehicle 10. In response to determining the percentage of the two image frames containing the regions of high motion 90 is less than the threshold percentage value, the spatial motion vector analysis module 54 of the one or more controllers 20 determine the image data captured by the one or more peripheral cameras 24 potentially represents the interior cabin 16 the vehicle 10. The method 400 may then proceed to block 420.

In block 420, the spatial and temporal motion vector analysis module 56 of the one or more controllers 20 analyzes each macroblock of each image frame that is part of the plurality of image frames from the image data captured by the one or more peripheral cameras 24 to determine regions of elevated motion within the plurality of image frames, where the plurality of image frames are collected over the length of time. The method 400 may then proceed to decision block 422.

In decision block 422, the spatial and temporal motion vector analysis module 56 of the one or more controllers 20 compare the size of the area representing the region of elevated motion within the plurality of image frames with the threshold coverage area. In response to determining the image data captured by the one or more peripheral cameras 24 represents the interior cabin 16 of the vehicle 10. The spatial and temporal motion vector analysis module 56 then instructs the one or more vehicle systems 26 to disregard the image data captured by the peripheral camera 24. The method 400 may then proceed to block 424.

In block 424, the spatial and temporal motion vector analysis module 56 of the one or more controllers 20 transmits the signal 94 to the notification module 62 indicating the image data captured by the peripheral camera 24 represents the interior cabin of the vehicle 10. The notification module 62 then instructs the one or more notification devices 28 to generate the notification to the occupant 40 indicating the one or more peripheral cameras 24 are capturing image data of the internal environment representative of the interior cabin 16 of the vehicle 10. It is to be appreciated that in embodiments, the notification to the occupant 40 may not be sent. The method 400 may then terminate.

Returning to block 422, in response to determining the size of the area representing the region of elevated motion is equal to or greater than the threshold coverage area, the spatial and temporal motion vector analysis module 56 of the one or more controllers 20 determine the image data captured by the one or more peripheral cameras 24 represents the exterior environment 14 surrounding the vehicle 10. The method 400 may then proceed to block 426.

In block 426, in response to determining the image data captured by the one or more peripheral cameras 24 represents the exterior environment 14 surrounding the vehicle 10, the spatial and temporal motion vector analysis module 56 of the one or more controllers 20 transmits the image data captured by the one or more peripheral cameras 24 to one or more vehicle systems 26. The method 400 may then terminate.

Referring generally to the figures, the disclosed image analysis system provides various technical effects and benefits. Specifically, the disclosed image analysis system provides a relatively lightweight approach for determining if image data captured by a peripheral camera is appropriate for use by one or more vehicle systems such as, for example, an autonomous driving system. It is to be appreciated that the disclosed approach requires significantly less computing resources when compared to various computer vision-based approaches that are currently available.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An image analysis system for a vehicle that analyzes image data captured by one or more peripheral cameras, the image analysis system comprising:
   one or more controllers, wherein the one or more controllers each include one or more processors that execute instructions to:
   receive the image data captured by the one or more peripheral cameras;
   classify each image frame of the image data captured by the one or more peripheral cameras over a predefined period of time as either a keyframe or a delta frame;
   compare an average frame size of all the delta frames that are part of the image data captured by the one or more peripheral cameras over the predefined period of time with a threshold average delta frame size;

determine a difference in pixel values between two image frames that are part of the image data captured by the one or more peripheral cameras with a threshold pixel value difference, wherein the two image frames are spaced apart by a time interval;

in response to determining the difference in pixel values between two image frames that are part of the image data captured by the one or more peripheral cameras is less than or equal to the threshold pixel value difference, and determining the average frame size of all of the delta frames that are part of the image data captured by the one or more peripheral cameras over the pre-defined period of time is less than or equal to the threshold average delta frame size, determine the image data captured by the one or more peripheral cameras represents an interior cabin of the vehicle; and in response to determining the image data captured by the one or more peripheral cameras represents an interior cabin of the vehicle, instruct one or more vehicle systems to disregard the image data captured by the peripheral camera.

2. The image analysis system of claim 1, wherein the one or more processors of the one or more controllers execute instructions to:

in response determining the difference in pixel values between two image frames that are part of the image data captured by the one or more peripheral cameras is greater than the threshold pixel value difference, or the average frame size of all of the delta frames that are part of the image data captured by the one or more peripheral cameras over the predefined period of time is greater the threshold average delta frame size, determine the image data captured by the one or more peripheral cameras potentially represents an exterior environment surrounding the vehicle.

3. The image analysis system of claim 2, wherein the one or more processors of the one or more controllers execute instructions to:

in response to determining the image data captured by the one or more peripheral cameras potentially represents the exterior environment surrounding the vehicle, determine a plurality of motion vectors that relate to a scene represented between two image frames that are part of the image data captured by the one or more peripheral cameras based on one or more video compression algorithms.

4. The image analysis system of claim 3, wherein the one or more processors of the one or more controllers execute instructions to:

analyze a magnitude of each of the plurality of motion vectors between the two image frames to determine a change in motion that corresponds to each motion vector; and map one or more regions of high motion and one or more regions of low motion within the two image frames by comparing the change in motion corresponding to each motion vector of the two image frames with a threshold motion value.

5. The image analysis system of claim 4, wherein the one or more processors of the one or more controllers execute instructions to:

determine a percentage of the two image frames containing the regions of high motion;

compare the percentage of the two image frames containing the regions of high motion with a threshold percentage value;

in response to determining the percentage of the two image frames containing the regions of high motion is at least equal to the threshold percentage value, determine the image data captured by the one or more peripheral cameras potentially represents the exterior environment surrounding the vehicle; and in response to determining the percentage of the two image frames containing the regions of high motion is less than the threshold percentage value, determine the image data captured by the one or more peripheral cameras potentially represents the interior cabin of the vehicle.

6. The image analysis system of claim 5, wherein the one or more processors of the one or more controllers execute instructions to:

analyze each macroblock of each image frame that is part of a plurality of image frames from the image data captured by the one or more peripheral cameras to determine regions of elevated motion within the plurality of image frames, wherein the plurality of image frames are collected over a length of time;

compare a size of an area representing the region of elevated motion within the plurality of image frames with a threshold coverage area; and in response to determining the size of the area representing the region of elevated motion is equal to or greater than the threshold coverage area, determine the image data captured by the one or more peripheral cameras represents the exterior environment surrounding the vehicle.

7. The image analysis system of claim 6, wherein the one or more processors of the one or more controllers execute instructions to:

in response to determining the image data captured by the one or more peripheral cameras represents the exterior environment surrounding the vehicle, transmit the image data captured by the one or more peripheral cameras to one or more vehicle systems.

8. The image analysis system of claim 6, wherein the one or more processors of the one or more controllers execute instructions to:

in response to determining the image data captured by the one or more peripheral cameras represents the exterior environment surrounding the vehicle, execute one or more edge detection algorithms to identify land marking disposed along a roadway; and in response to identifying lane markings within the image data captured by the one or more peripheral cameras, confirm the image data is representative of the exterior environment surrounding the vehicle.

9. The image analysis system of claim 1, wherein the one or more peripheral cameras are in electronic communication with the one or more controllers, and wherein the one or more peripheral cameras are part of a personal mobile device of an occupant of the vehicle.

10. The image analysis system of claim 1, wherein the one or more processors of the one or more controllers execute instructions to:

in response to determining the image data captured by the one or more peripheral cameras represents an interior cabin of the vehicle, instruct one or more notification devices to generate a notification indicating the one or more peripheral cameras are capturing image data of the interior cabin of the vehicle.

11. The image analysis system of claim 1, wherein the one or more peripheral cameras is a bring your own device (BYOD) camera.

12. The image analysis system of claim 1, wherein the one or more peripheral cameras represents a device that is temporarily connected to the one or more controllers in response to determining one or more in-vehicle cameras are non-operational.

13. The image analysis system of claim 1, wherein threshold average delta frame size is selected to be at least equal to an average delta frame size of a stream of image data representative of an interior cabin of the vehicle and less than an average delta frame size of a stream of image data representative of an exterior environment surrounding the vehicle.

14. A method for analyzing image data captured by one or more peripheral cameras of a vehicle, the method comprising:

receiving, by one or more controllers, the image data captured by the one or more peripheral cameras;

classifying, by the one or more controllers, each image frame of the image data captured by the one or more peripheral cameras over a predefined period of time as either a keyframe or a delta frame;

comparing, by the one or more controllers, an average frame size of all the delta frames that are part of the image data captured by the one or more peripheral cameras over the predefined period of time with a threshold average delta frame size;

determining, by the one or more controllers, a difference in pixel values between two image frames that are part of the image data captured by the one or more peripheral cameras with a threshold pixel value difference, wherein the two image frames are spaced apart by a time interval;

in response to determining the difference in pixel values between two image frames that are part of the image data captured by the one or more peripheral cameras is less than or equal to the threshold pixel value difference, and determining the average frame size of all of the delta frames that are part of the image data captured by the one or more peripheral cameras over the predefined period of time is less than or equal to the threshold average delta frame size, determining the image data captured by the one or more peripheral cameras represents an interior cabin of the vehicle; and in response to determining the image data captured by the one or more peripheral cameras represents an interior cabin of the vehicle, instructing one or more vehicle systems to disregard the image data captured by the peripheral camera.

15. The method of claim 14, further comprising:

in response determining the difference in pixel values between two image frames that are part of the image data captured by the one or more peripheral cameras is greater than the threshold pixel value difference, or the average frame size of all of the delta frames that are part of the image data captured by the one or more peripheral cameras over the predefined period of time is greater than the threshold average delta frame size, determining the image data captured by the one or more peripheral cameras potentially represents an exterior environment surrounding the vehicle.

16. The method of claim 15, further comprising:

in response to determining the image data captured by the one or more peripheral cameras potentially represents the exterior environment surrounding the vehicle, determine a plurality of motion vectors that relate to a scene represented between two image frames that are part of the image data captured by the one or more peripheral cameras based on one or more video compression algorithms.

17. The method of claim 16, further comprising:

analyzing a magnitude of each of the plurality of motion vectors between the two image frames to determine a change in motion that corresponds to each motion vector; and mapping one or more regions of high motion and one or more regions of low motion within the two image frames by comparing the change in motion corresponding to each motion vector of the two image frames with a threshold motion value.

18. The method of claim 17, further comprising:

determining a percentage of the two image frames containing the regions of high motion;

comparing the percentage of the two image frames containing the regions of high motion with a threshold percentage value;

in response to determining the percentage of the two image frames containing the regions of high motion is at least equal to the threshold percentage value, determining the image data captured by the one or more peripheral cameras potentially represents the exterior environment surrounding the vehicle; and in response to determining the percentage of the two image frames containing the regions of high motion is less than the threshold percentage value, determining the image data captured by the one or more peripheral cameras potentially represents the interior cabin the vehicle.

19. The method of claim 18, further comprising:

analyzing each macroblock of each image frame that is part of a plurality of image frames from the image data captured by the one or more peripheral cameras to determine regions of elevated motion within the plurality of image frames, wherein the plurality of image frames are collected over a length of time;

comparing a size of an area representing the region of elevated motion within the plurality of image frames with a threshold coverage area; and in response to determining the size of the area representing the region of elevated motion is equal to or greater than the threshold coverage area, determining the image data captured by the one or more peripheral cameras represents the exterior environment surrounding the vehicle.

20. An image analysis system for a vehicle that analyzes image data, the image analysis system comprising:

one or more peripheral cameras that capture the image data;

one or more notification devices that generate a notification for an occupant of the vehicle; and one or more controllers in electronic communication with the one or more peripheral cameras and the one or more notification devices, wherein the one or more controllers each include one or more processors that execute instructions to:

receive the image data captured by the one or more peripheral cameras;

classify each image frame of the image data captured by the one or more peripheral cameras over a predefined period of time as either a keyframe or a delta frame;

compare an average frame size of all the delta frames that are part of the image data captured by the one or more peripheral cameras over the predefined period of time with a threshold average delta frame size;

determine a difference in pixel values between two image frames that are part of the image data captured by the one or more peripheral cameras with a threshold pixel value difference, wherein the two image frames are spaced apart by a time interval; 5 in response to determining the difference in pixel values between two image frames that are part of the image data captured by the one or more peripheral cameras is less than or equal to the threshold pixel value difference, and determining the average frame size of all of 10 the delta frames that are part of the image data captured by the one or more peripheral cameras over the pre-defined period of time is less than or equal to the threshold average delta frame size, determine the image data captured by the one or more peripheral cameras 15 represents an interior cabin of the vehicle; and in response to determining the image data captured by the one or more peripheral cameras represents an interior cabin of the vehicle, instruct the one or more notification devices to generate a notification indicating the one 20 or more peripheral cameras are capturing image data of the interior cabin of the vehicle.

* * * * *